United States Patent [19]

White

[11] 4,145,713

[45] Mar. 20, 1979

[54] COMPOSITE VIDEO SIGNAL FIELD RECOGNITION CIRCUIT

[75] Inventor: Robert E. White, La Mesa, Calif.

[73] Assignee: The United States of America as represented by the Secretary of the Navy, Washington, D.C.

[21] Appl. No.: 828,809

[22] Filed: Aug. 29, 1977

[51] Int. Cl.² .............................................. H04N 9/58
[52] U.S. Cl. ...................................... 358/92; 358/139
[58] Field of Search .................................. 358/92, 139

[56] References Cited

U.S. PATENT DOCUMENTS

| | | | |
|---|---|---|---|
| 3,358,079 | 12/1967 | Banning | 358/92 |
| 3,485,950 | 12/1969 | Reiser | 358/139 |
| 3,621,127 | 11/1971 | Hope | 358/92 |
| 3,737,567 | 6/1973 | Kratomi | 358/92 |
| 3,992,573 | 11/1976 | White | 358/92 |

Primary Examiner—Howard W. Britton
Attorney, Agent, or Firm—Richard S. Sciascia; Ervin F. Johnston; Thomas G. Keough

[57] ABSTRACT

An improvement for a stereoscopic system synchronizes a video monitor and a left-and right-eye viewer. Synchronous operation at a field-by-field rate is triggered by coincidence and noncoincidence of horizontal sync pulses with coincidence pulses derived from the horizontal sync pulses. As a result, the field carrying the left eye image is always connected to the left eye lens of the viewer and the field carrying the right eye image is always coupled to the right eye lens of the viewer.

5 Claims, 3 Drawing Figures

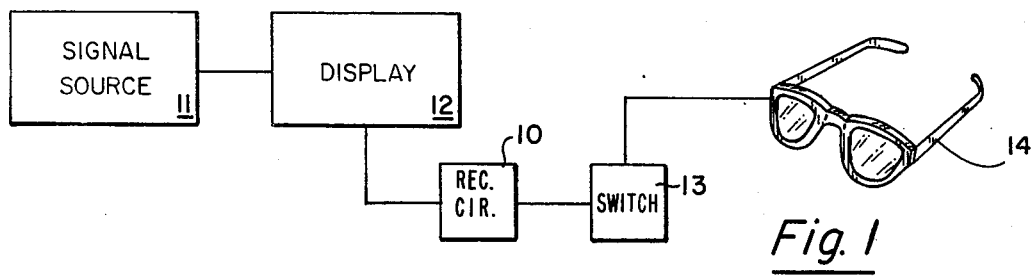
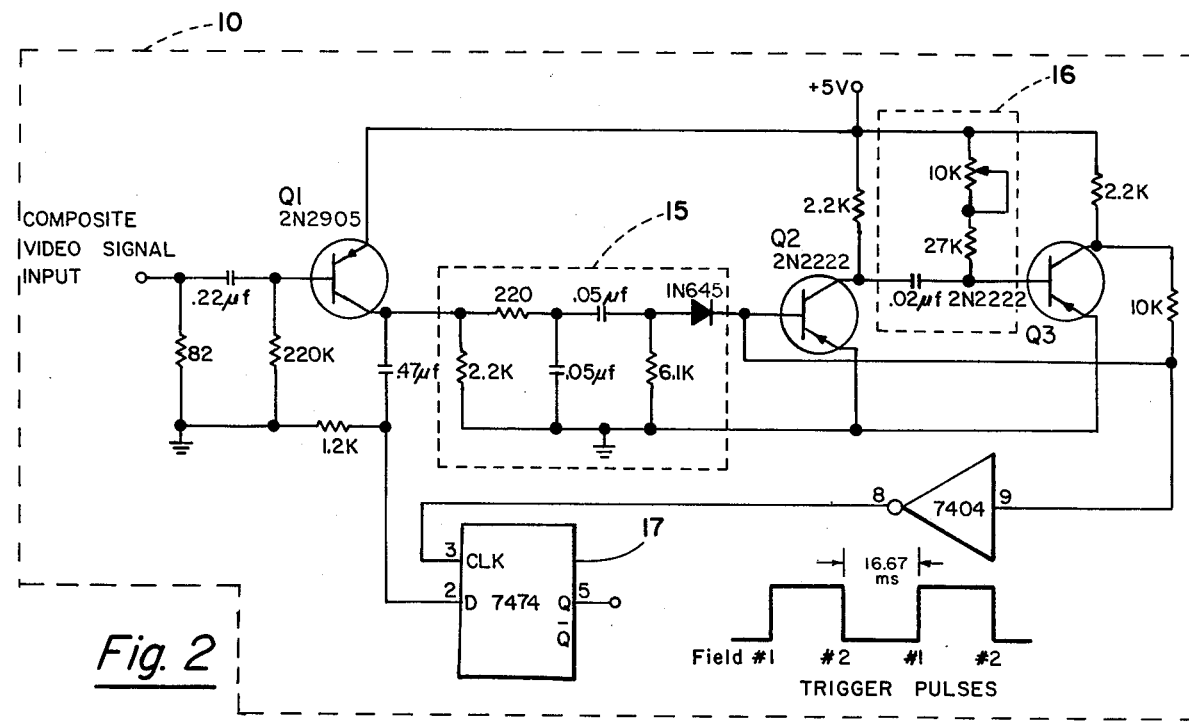
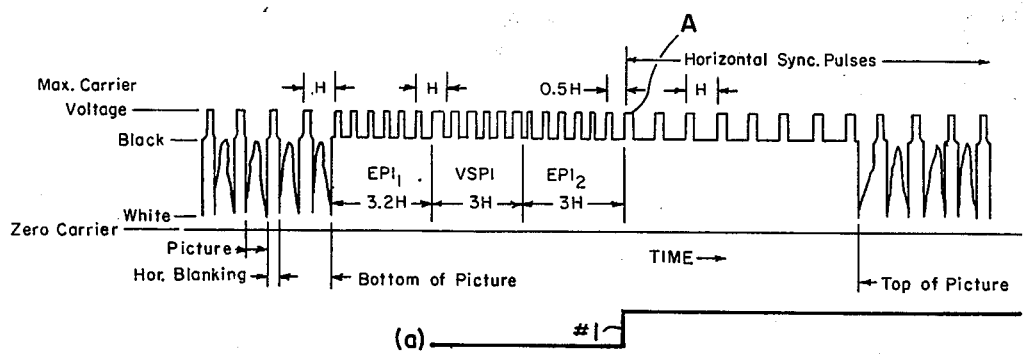
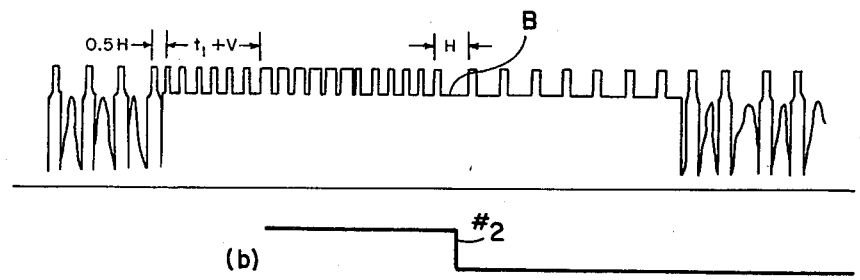

COMPOSITE VIDEO SIGNAL FIELD RECOGNITION CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

An increased interest is developing in stereoscopic video imaging. Although a number of techniques have evolved for three dimensional viewing, the U.S. Pat. No. 4,021,846 entitled "Liquid Crystal Stereoscopic Viewer" by John A. Roese is representative of one of the more promising designs. A liquid crystal, a nematic liquid crystal, is fashioned in the shape of a left lens and a right lens in a stereoscopic viewer. A display console is synchronized with the viewer so that the frames are through the left and right lenses when a suitable voltage is applied to each of the lenses. Synchronization of the lenses with the screen of the display is essential to produce the desired three dimensional effect. Frame rate synchronization has been preferred since the liquid crystals are relatively slow to change their transmissivity in response to an applied voltage. However, stereoscopically displaying a conventional video signal at the frame rate introduces a bothersome, throbbing image, for the eyes are able to sense, if not actually see, the changing frames. Faster switching times at the field rate alleviate the throbbing phenomena but the liquid crystals tended to be incapable of reacting satisfactorily at the field rate. U.S. Pat. No. 3,903,358 entitled "PLZT Stereoscopic Television System" by John A. Roese discloses faster switching by the lenses of a viewer. Fashioning lenses from a ferroelectric lead zirconate-titanate ceramic material allowed switching at the faster field rate. Because the switching times and opacity-transmission ratios are much improved, stereoscopic imaging at a synchronous field rate is now a possibility. However, most conventional methods of synchronizing the video signals generally do so by analog methods, stripping the high frequency video and horizontal pulses from the composite video signal and leaving only the vertical sync pulses which are undefined as to which field is which. In other words, switching is possible at the field rate with one field displaying the odd lines and the other field displaying the even lines of the scan. But there is no way of discerning a left eye field (for example, the odd lines) from the right eye field (the even lines). Representative stereoscopic imaging requires that the left eye image be shown to the left eye only and the right eye image be shown to the right eye only. If an imaging system falls out of sync so that the left eye image is shown to the right eye and the right eye image is shown to the left eye, the image perceived is confusing and not truly stereoscopic. Therefore, there is a continuing need in the state-of-the-art for an improvement for stereoscopic imaging systems which assures the identity of the even and odd scan fields to assure a representative stereoscopic imaging.

SUMMARY OF THE INVENTION

The present invention is directed to provide an improvement for a system having a device for viewing left and right stereoscopic images of composite video signals on a display console. A means is connected to the viewing device and coupled to receive the composite video signals. From composite video signals the means derives triggering signals from the horizontal synchronization pulses to actuate the viewing device with triggering signals which provide the left and right stereoscopic images in synchronization with the field rate of the composite video signals.

It is an object of the invention to provide for improved stereoscopic imaging.

A further object is to provide an apparatus for discerning between the alternating fields of a composite video signal.

Yet another object is to provide a circuit responsive to horizontal synchronization pulses to discern between alternating field scans.

Yet another object is to provide a circuit relying upon coincidence and noncoincidence of signals to identify the two fields of frames of a composite video signal.

Another object is to provide a circuit compatible with contemporary stereoscopic viewing systems to enable a more representative viewing of stereoscopic images.

These and other objects of the invention become more readily apparent from the ensuing specification when taken with the drawings.

BRIEF DESCRIPTION OF THE DRAWINGS

FIG. 1 sets forth the invention in block diagram form.

FIG. 2 is a circuit diagram of the invention.

FIG. 3a and 3b show a typical composite video waveform.

DESCRIPTION OF THE PREFERRED EMBODIMENT

Referring now to the drawing, FIG. 1 depicts a typical system for displaying stereoscopic images. Improved operation is assured by its inclusion of a field recognition circuit 10 of the type to be described herein. A source of video signals 11, be it an antenna or a tape recorder etc., delivers a composite video signal through a conventional video monitor 12. A display on the monitor is made in accordance with proven techniques with a first field showing, for example, the odd lines and a second, for example, showing the even lines of each frame of video information.

The composite video signal from the source also is fed to field recognition circuit 10 which generates field one and field two triggering pulses and feeds them to an electronic switch 13. The switch is a conventional design which alternately drives a stereoscopic viewer 14 to alternately change the transmissivity of its two lenses in response to the triggering pulses.

Stereoscopic displays are most representatively displayed by showing the left eye image on the first field and the right eye image on the second field. This faster rate, as opposed to showing alternating images via the frame rate, eliminates what observers described as being a throbbing which is not immediately identifiable as such. That is to say, a definite flickering of the images is not apparent but after a period of watching a stereoscopic display at the frame rate, an observer experiences fatigue and the sensation that the presentation is throbbing. Thus, it is to an observer's advantage to have the stereoscopic information displayed at a faster alternating field rate. Sensing the two fields and providing trigger pulses for an electronic switch 13 is the function of the field recognition circuit 10.

The composite video signals received by the field recognition circuit have an appearance generally as depicted in FIGS. 3a and 3b where H is equal to the time from the start of one line to the start of the next line of a scan and V is the time from the start of one field to the start of the next field. The composite video signal is amplified by transistor $Q_1$ and its associated circuitry and feeds it to a low pass filter 15. The filter has a pass band below 200 Hz to block the picture information while passing the vertical sync pulses occurring during the vertical sync pulse interval (VSPI), to transistor $Q_2$.

$Q_2$ goes positive at the start of the VSPI and is held positive throughout the equalizing pulse interval (second) ($EPI_2$) and 0.5H or 1.5H, the 0.5H period being shown in the drawings. This is due to the regeneration from a bias and timing circuit 16 in combination with a transistor $Q_3$ which also sharpens the trailing edge. This positive condition has been defined as the coincidence pulse and has a duration from the beginning of the VSPI to 0.5H in the horizontal sync pulse time slot, HSPTS, that is approximately 0.5H after the last equalizing pulse.

Referring to FIG. 3a, when the coincidence pulse at the output of $Q_3$ is positive there will be a coincidence at flip-flop 17 between the coincidence signal and the horizontal sync pulse A of the odd field. This coincidence causes the generation of a positive logical one, field one, #1, trigger signal at the output pin 5 of the flip-flop (field one corresponds to the odd lines or the left eye field).

After all of the first field video information has been displayed (it being understood that all of the information is not shown to avoid unneeded redundancy in the drawings), field two information is ready for display see FIG. 3b. The coincidence signal again is generated from the beginning of the VSPI through the $EPI_2$ and 0.5H thereafter. This coincidence signal of field two is substantially identical to the field one signal and is fed to coincidence circuit 17. However, at this time in the HSPTS there is no coincidence between the coincidence signal and a horizontal sync pulse because there is no horizontal sync pulse (note the absence of a horizontal sync pulse at B in FIG. 3b). In other words, at the time when only the coincidence pulse reaches the SN7474 flip-flop, it is reset producing a negative logical zero, field two, #2, triggering signal for the duration of the number two field.

The triggering signal is fed to the electronic switch which appropriately controls the viewing device. Thus, there is a positive synchronization of the lenses of the viewing device with the video display. Even if several fields or frames of information are lost over a period of time, the field recognition circuit of this invention will once again produce triggering signals that will switch the left lens of the viewing device to receive the left image and the right lens of the viewing device to receive the right image.

Obviously, many modifications and variations of the present invention are possible in the light of the above teachings, and it is therefore understood the invention can be practiced otherwise than as specifically described.

What is claimed is:

1. In a system having a device for viewing left and right stereoscopic images of composite video signals on a console, an improvement therefor is provided comprising:

means connected to the viewing device and coupled to receive the composite video signals for deriving separate positive logical one and negative logical zero triggering signals from horizontal synchronization pulses of one field and the sequential other field of the composite video signals respectively, and for actuating the viewing device with the separate positive logical one and negative logical zero triggering signals to provide the left and right stereoscopic images in synchronization with the field rate of the composite video signals.

2. An improved system according to claim 1 in which the deriving and actuating means includes an amplifying stage coupled to receive the composite video signal, a filter stage to feed horizontal synchronization signals therethrough and a coincidence pulse stage coupled to generate coincidence pulses.

3. An improved system according to claim 2 in which the deriving and actuating means further includes a coincidence stage coupled to receive the composite video signal and the coincidence pulses to generate the logical one and logical zero triggering signals in response thereto.

4. An improved system according to claim 3 in which the coincidence stage includes a timing circuit coupled to regulate the duration of the coincidence pulse to a fraction of the period of time for one line scan.

5. An improved system according to claim 4 in which the coincidence stage includes a flip flop responsive to coincidence pulses to generate the logical one and logical zero trigger signals.

* * * * *